United States Patent [19]

Asami et al.

[11] Patent Number: 5,573,362
[45] Date of Patent: Nov. 12, 1996

[54] FASTENER INCLUDING ELASTIC LEGS FOR RETAINING THE FASTENER IN A MOUNTING HOLE

[75] Inventors: Goro Asami, Machida; Eiji Ueno, Utsunomiya, both of Japan

[73] Assignee: NIFCO Inc., Japan

[21] Appl. No.: 487,688

[22] Filed: Jun. 7, 1995

[30] Foreign Application Priority Data

Aug. 16, 1994 [JP] Japan .................................. 6-192581

[51] Int. Cl.⁶ .......................... F16B 19/00; F16B 37/04
[52] U.S. Cl. .................. 411/509; 411/182; 411/913
[58] Field of Search .................................. 411/182, 508, 411/509, 510, 913

[56] References Cited

U.S. PATENT DOCUMENTS

| | | | |
|---|---|---|---|
| 3,678,797 | 7/1972 | Seckerson | 411/509 |
| 3,745,612 | 7/1973 | Seckerson | 411/509 |
| 3,776,092 | 12/1973 | Seckerson | 411/509 |
| 4,987,656 | 1/1991 | Sato | 411/508 X |
| 5,319,839 | 6/1994 | Shimajiri | 24/297 X |

FOREIGN PATENT DOCUMENTS 3-113108  5/1991  Japan .

*Primary Examiner*—Neill R. Wilson
*Attorney, Agent, or Firm*—Parkhurst, Wendel & Burr, L.L.P.

[57] ABSTRACT

A clip comprised of a head portion retained to a panel, and a leg portion inserted and retained in a mounting hole. The leg portion has a leg plate, elastic legs which project out from the longitudinally-extending transverse direction sides of the leg plate so as to form curved surfaces which face each other, and pawl portions protruded from the elastic legs. Curved outer surfaces of the pawl portions are disposed on a circular locus around central points on side surfaces of the leg plate, and have a greater curvature than the curvature of the mounting hole. As a result, when the leg portion is inserted into the mounting hole, the entire peripheral surfaces of the pawl portions do not contact the peripheral wall of the mounting hole, but only point-contact the peripheral wall of the mounting hole at points. Therefore, frictional force between the mounting hole and the leg portion is small, and insertion force is reduced. Although the clip requires little insertion force, a large retaining force for retaining the clip in the mounting hole is obtained.

16 Claims, 4 Drawing Sheets

FASTENER INCLUDING ELASTIC LEGS FOR RETAINING THE FASTENER IN A MOUNTING HOLE

BACKGROUND OF THE INVENTION

1. Field of the Invention

The present invention relates to a clip which, in a single operation, is inserted into and retained in a mounting hole formed in a mounting panel so as to mount a member such as a plaque or the like to the mounting panel.

2. Description of the Related Art

A conventional clip for holding is illustrated in FIGS. 5 and 6. The leg portion of the clip is, in a single operation, inserted into and retained to a mounting hole formed in a mounting panel, so that a plaque or the like is fixed by the head portion of the clip (refer to Japanese Patent Application Laid-Open No. 3-113108).

The conventional holding clip 50 is formed by a head portion 52 which is positioned at the surface side of a mounting panel 56, and leg portions 54 which extend from the head portion 52 and are inserted into and retained to a mounting hole 58. When a cut section of the leg portions 54 is viewed from the bottom thereof as illustrated in FIG. 7, the leg portions 54 can be seen to have circular arc shaped configurations which correspond to the configuration of the mounting hole 58, and are formed in a substantial S-shape on the whole.

The leg portions 54 are tapered, and are formed integrally with a pillar portion 60 which extends from the center of the head portion 52. Empty spaces 62 are provided between the leg portions 54 and the pillar portion 60, so that the leg portions 54 can be bent.

Pawl portions 64 are formed at the outer surfaces of the leg portions 54 along the peripheral directions of the leg portions 54. As illustrated in FIG. 7, before insertion into the mounting hole 58, the pawl portions 64 protrude further than the inner diameter of the mounting hole 58. Further, the outer curved surfaces of the pawl portions 64 are formed with the same curvature as or a smaller curvature than that of the mounting hole 58 so as to contact the peripheral wall of the mounting hole 58 as much as possible and so as to be pushed uniformly.

With this type of holding clip 50, because the pawl portions 64 are pushed uniformly, the leg portions 54 can be inserted into the mounting hole 58 gently without the insertion force being weak in some areas and strong in others. However, because the outer curved surfaces of the pawl portions 64 contact the peripheral wall of the mounting hole 58 along the entirety of the outer curved surfaces, a large frictional force is generated, and the overall insertion force increases. In a case in which the mounting hole 58 is formed by reverse punching (i.e., in a case in which the mounting hole is punched from the side opposite to the side into which the clip is inserted), the insertion force increases even more, which results in difficulties in the mounting operation such as the need for a large insertion force.

SUMMARY OF THE INVENTION

In view of the aforementioned, an object of the present invention is to provide a clip requiring a small insertion force for mounting to a mounting hole, and providing a large holding force in the mounting hole.

The present invention is a clip having a head portion abutting a mounting panel in which a mounting hole is formed, and a leg portion extending from the head portion and inserted into and retained in the mounting hole, the leg portion comprising: a leg plate which extends from the head portion and whose distal end is tapered; elastic legs projecting from transverse direction ends of the leg plate so as to form curved surfaces which face each other, and hollow portions are formed between the elastic legs and the leg plate, and distal ends of the elastic legs are integral with the leg plate so as to form a conical insertion portion, and proximal ends of the elastic legs are connected to the head portion; and pawl portions protruding from outer peripheral surfaces of the elastic legs, respective curvatures of outer curved surfaces of the pawl portions being larger than a curvature of the mounting hole of the mounting panel.

In the clip of the first aspect of the present invention, a leg body, which is inserted into a mounting hole and which forms a leg portion, extends from the center of a head portion, and the distal end of the leg body is tapered. Elastic legs project out from the transverse direction ends of the leg body so as to form curved surfaces which face each other. Hollow portions are formed between the elastic legs and the leg body. Because the elastic legs project out from the leg body which is tapered, the outer configuration of the elastic legs is a configuration which narrows towards the distal end. The elastic legs are elastically deformable toward the hollow portions.

The distal ends of the elastic legs are integral with the leg body such that a conical insertion portion is formed. The insertion portion facilitates insertion into a mounting hole. Because the proximal ends of the elastic legs are connected to the head portion, even if insertion and withdrawal of the clip is repeated, the clip can be reused without the elastic legs permanently bending and deforming toward the hollow portions.

The pawl portions protrude from the outer peripheral surfaces of the elastic legs, and the curvature of the outer curved surfaces of the pawl portions is greater than the curvature of the mounting hole. Accordingly, when the leg portion is inserted into the mounting hole, the entire surfaces of the pawl portions do not contact the peripheral wall of the mounting hole, and the pawl portions point-contact the peripheral wall of the mounting hole. Therefore, the frictional force with the mounting hole decreases, and the insertion force decreases.

When the pawl portions pass the mounting hole, the configurations of the elastic legs are restored, and the edge of the mounting hole is nipped between the head portion and the pawl portions. At this time, the outer peripheries of the proximal ends of the elastic legs fit tightly against the peripheral wall of the mounting hole, and resistance against withdrawal is exhibited.

In the clip of the second aspect of the present invention, the final ends of the elastic legs in the projecting direction thereof project so as to pass a cutting line which passes through the center of the leg plate and divides the leg plate in half in the transverse direction thereof. Further, the pawl portions are formed such that the amounts of protrusion thereof become maximum amounts on the cutting line. Accordingly, a mold for forming the clip can be separated into two portions at the cutting line.

In the clip of the third aspect of the present invention, the connecting portions which connect the elastic legs and the head portion are thin. As a result, the proximal ends of the elastic legs are easy to bend, which leads to a reduction in the insertion force.

In the clip of the fourth aspect of the present invention, the connecting portions which connect the elastic legs and the head portion are cut so as to form taper surfaces. These taper surfaces are inclined in directions of making the lengths of the connecting portions in the circumferential directions thereof shorter. As a result, when the elastic legs are inserted into the mounting hole, the edge of the mounting hole is guided by the taper surfaces and reaches the head portion. Therefore, the insertion force is reduced. Further, the taper surfaces serve as engaging surfaces and exhibit resistance against forces for pulling out the clip.

DESCRIPTION OF THE PREFERRED EMBODIMENTS

Figure 1:
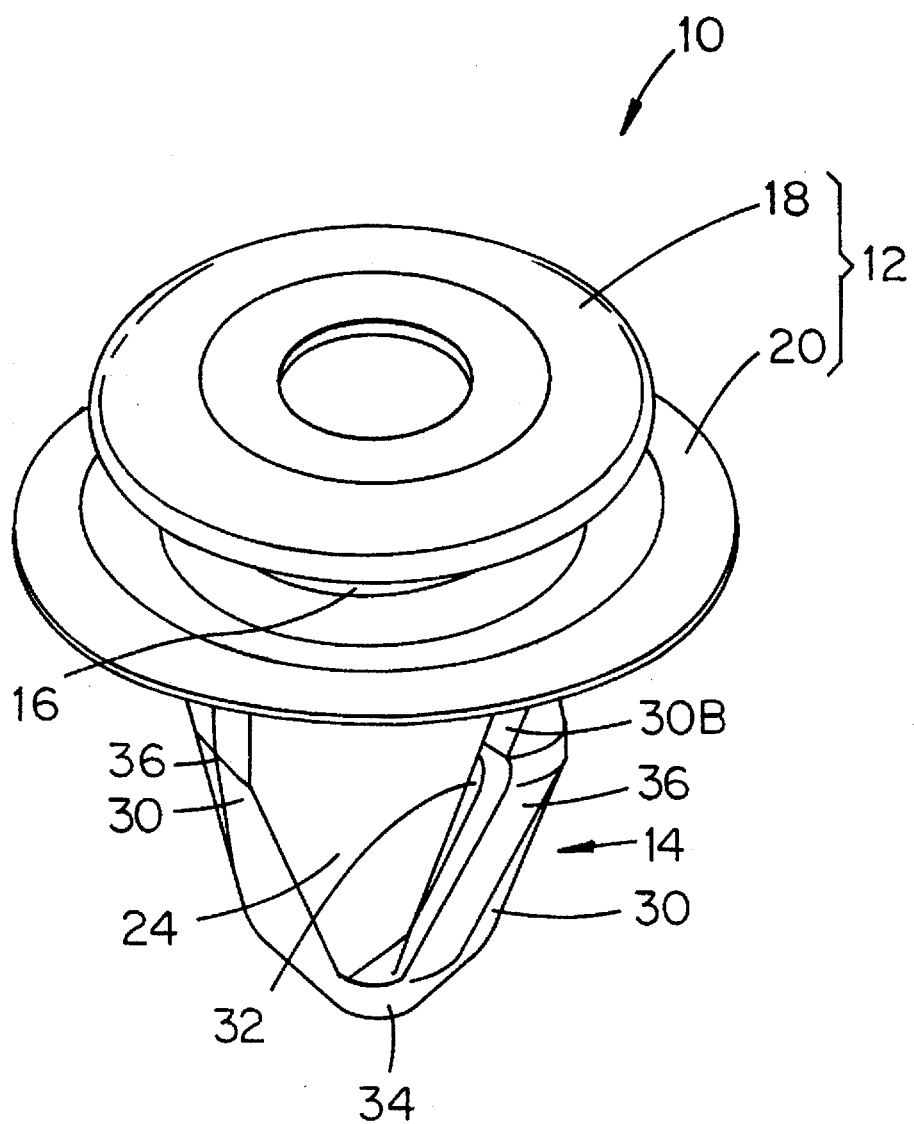
FIG. 1 is a perspective view of a clip relating to an embodiment of the present invention.
Figure 2:
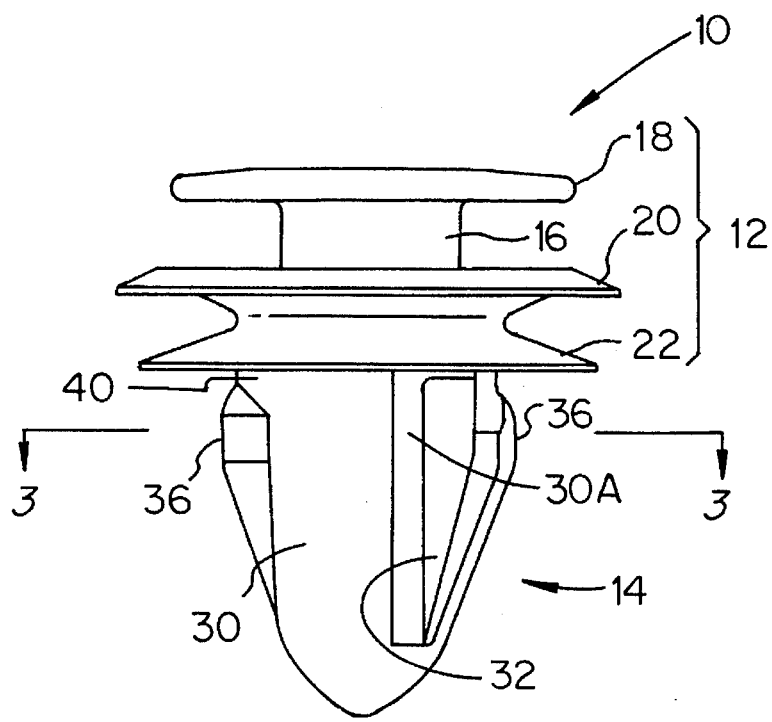
FIG. 2 is a front view of the clip relating to the embodiment.

As illustrated in FIGS. 1 and 2, a clip 10 relating to the present invention is formed of a head portion 12 and a leg portion 14. Connecting portions 40 are provided between the head portion 12 and the leg portion 14 such that the head portion 12 and the leg portion 14 are integrally connected.

The head portion 12 includes a circular plate 18, an upper flange 20 and a lower flange 22. The circular plate 18 is provided at the top end of a core member 16. The upper flange 20 is disposed such that a predetermined interval is provided between the upper flange 20 and the circular plate 18, and the outer peripheral portion of the upper flange 20 slightly bends upward toward the circular plate 18. The lower flange 22 is provided under the upper flange 20, and the outer peripheral portion thereof widens in an umbrella-like shape toward the leg portion 14.

Figure 4:
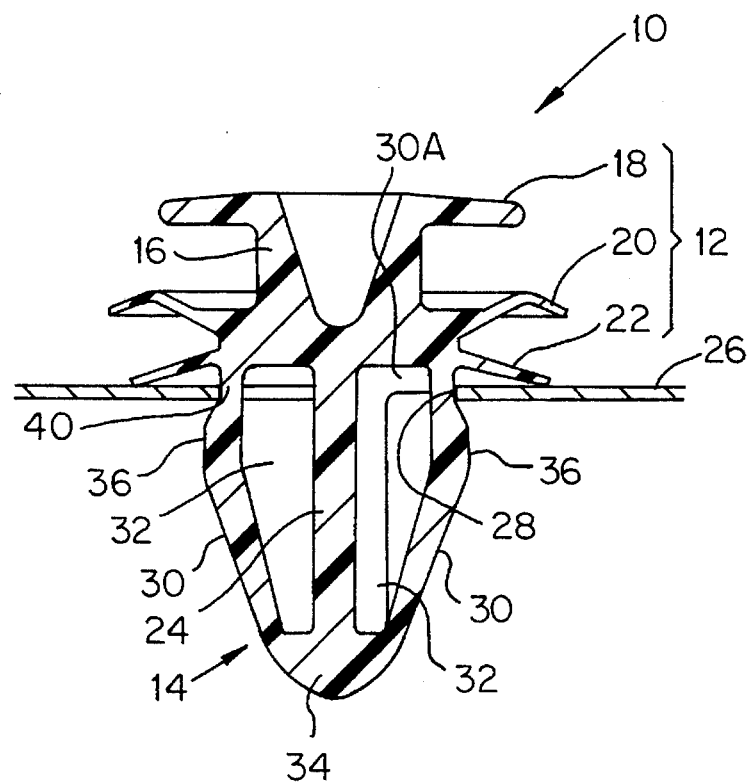
FIG. 4 is a side sectional view of the clip relating to the embodiment.
Figure 5:
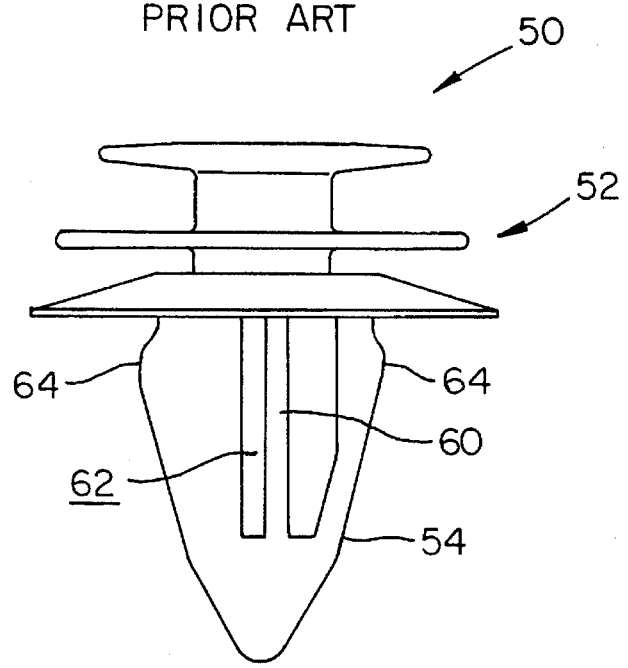
FIG. 5 is a front view of a conventional clip.
Figure 6:
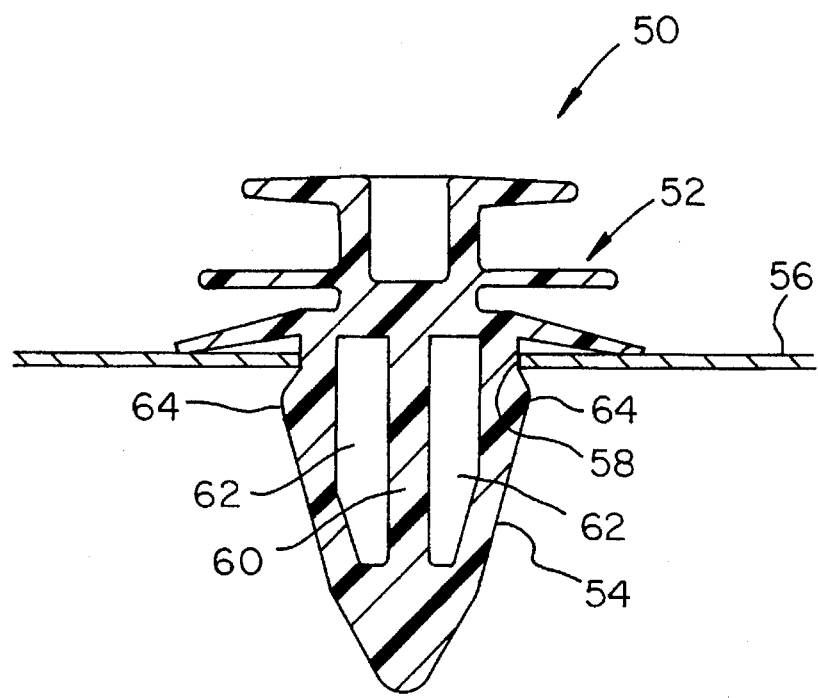
FIG. 6 is a side sectional view of a conventional clip.
Figure 7:
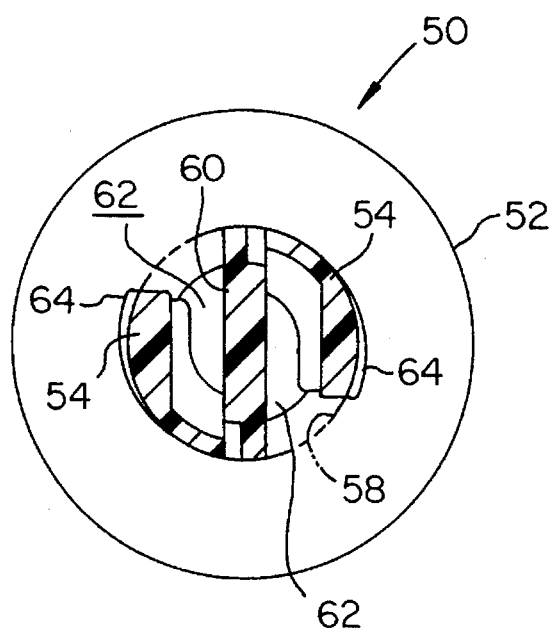
FIG. 7 is a sectional view in which a leg portion of a conventional clip is cut and viewed from below.

As illustrated in FIG. 4, a plate-shaped leg plate 24 extends from the central portion of the lower surface of the lower flange 22. The width of the proximal end of the leg plate 24 is substantially the same as the inner diameter of a mounting hole 28 formed in a mounting panel 26. Further, the leg plate 24 tapers toward the distal end thereof in the direction of extension.

Elastic legs 30 project out from the transverse direction ends of the leg plate 24 so as to form curved surfaces which face each other. Accordingly, the outer configuration of the elastic legs 30 is a configuration which narrows toward the distal end. Hollow portions 32 are formed between the elastic legs 30 and the leg plate 24. The elastic legs 30 are thereby elastically deformable toward the hollow portions 32.

The distal ends of the elastic legs are formed integrally with the leg plate 24 so as to form a conical insertion portion 34. The insertion portion 34 serves as a guide and facilitates insertion into the mounting hole 28. The proximal end sides and the leg plate sides of the elastic legs 30 are formed as thin portions 30A and connect with the lower flange 22 and the leg plate 24, respectively. In this way, the insertion force can be reduced and the clip 10 can be reused without the elastic legs 30 permanently bending and deforming toward the hollow portions 32. Further, taper surfaces 30B are formed at the proximal ends of the elastic legs 30. The taper surfaces 30B are inclined in directions of making shorter the lengths of the thin portions 30A in the circumferential directions thereof from the final ends of the elastic legs 30 in the projecting directions thereof. As a result, when the elastic legs 30 are inserted into the mounting hole 28, the edge of the mounting hole 28 is guided by the taper surfaces 30B, and therefore, the insertion force is reduced. The taper surfaces 30B are engaging surfaces which exhibit resistance against forces for pulling out the clip 10.

Figure 3:
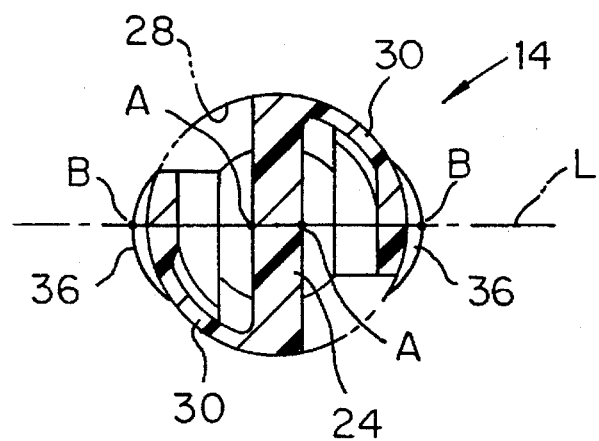
FIG. 3 is a sectional view in which a leg portion of the clip relating to the embodiment is cut and viewed from above.

As shown in FIG. 3, the end portions of the elastic legs 30 in the projecting directions thereof pass the axial center of the leg plate 24 and project to positions past a cutting line L which divides the leg plate 24 in the transverse direction. The outer configuration of the elastic legs 30 are substantially the same configuration as the inner configuration of the mounting hole 28. Pawl portions 36, which protrude further than the inner configuration of the mounting hole 28, are formed at the end portions of the elastic legs 30.

The outer curved surfaces of the pawl portions 36 are on the loci of circles whose central points A are the side surfaces of the leg plate 24, and have curvatures which are greater than the curvature of the mounting hole 28. As a result, when the leg portion 14 is inserted into the mounting hole 28, the entire peripheral surfaces of the pawl portions 36 do not contact the peripheral wall of the mounting hole 28, and only the portions at points B point-contact. Therefore, the frictional force with the mounting hole 28 is small, and the insertion force is decreased.

Further, because the pawl portions 36 are formed such that the amounts of protrusion thereof become greatest on the cutting line L, a mold for forming the clip 10 can be separated into two portions at the cutting line L. Because vicinities of the elastic legs 30 connected to the leg plate 24 are thin, the elastic legs 30 are easy to bend.

Next, operation of the clip relating to the present invention will be described.

First, when the leg portion 14 of the clip 10 is inserted into the mounting hole 28, the pawl portions 36 point-contact the edge of the mounting hole 28. In this way, the elastic legs 30 bend toward the hollow portions 32. When the leg portion 14 is further pushed and the pawl portions 36 pass the mounting hole 28, the configurations of the elastic legs 30 are restored, and the edge of the mounting hole 28 is nipped between the head portion 12 and the pawl portions 36. At this time, the lower flange 22 is fit tightly to the mounting panel 26, and leaking from the mounting hole 28 can be prevented.

Great resistance against forces for pulling out the clip 10 is exhibited because the thin portions 30A of the elastic legs 30 tightly contact the peripheral wall of the mounting hole 28 and the entire protruding portions of the pawl portions 36 contact the edge of the mounting hole 28. Further, the engaging force of the taper surfaces 30B also contributes to this resistance.

A plaque is mounted between the upper flange 20 and the circular plate 18 via unillustrated "snowman" holes which are respectively shaped as a small-diameter circular opening disposed above and communicating with a larger-diameter circular opening therebeneath. Further, the present embodiment illustrates the clip 10 at which a plaque is mounted to the head portion 12. However, the distinguishing features of the present invention reside in the leg portion 14, and the configuration of the head portion is not limited.

As the present invention is structured as described above, the insertion force of the clip is small, and the force for holding the clip in a mounting hole is large.

Although a particular embodiment of the present invention has been illustrated and described, it will be apparent to those skilled in the art that various changes and modifications can be made without departing from the spirit of the present invention. The appended claims are therefore intended to cover all changes and modifications that fall within the scope of the present invention.

What is claimed is:

1. A fastener having a head portion for abutting a mounting panel in which a mounting hole is formed, and a leg portion extending from said head portion for insertion into the mounting hole, said leg portion comprising:

a leg plate which extends from said head portion, said leg plate having a distal end which is tapered, and opposing transverse sides that extend along a longitudinal direction of the leg plate;

elastic legs integrally connected to the transverse sides of the leg plate, and circumferentially projecting from said transverse sides of said leg plate such that hollow portions are formed between said elastic legs and said leg plate, wherein distal ends of said elastic legs are integral with said leg plate to form a conical insertion portion, and proximal ends of said elastic legs are connected to said head portion; and pawl portions protruding from outer peripheral surfaces of said elastic legs, said pawl portions having outer curved surfaces having curvatures that are larger than a curvature of the mounting hole of the mounting panel, wherein said elastic legs project circumferentially past an axial center of said leg plate and project past a cutting line which divides said leg plate in half in a transverse direction thereof, said pawl portions reaching a maximum protrusion such that the protrusions point-contact an inner peripheral surface of the mounting hole of the mounting panel upon insertion into the mounting hole, whereby frictional force with the mounting hole is reduced and insertion force is reduced.

2. A fastener according to claim 1, wherein a width of a proximal end of said leg plate is substantially the same as an inner diameter of the mounting hole of the mounting panel.

3. A fastener according to claim 1, wherein portions of said elastic legs that are connected to said elastic plate are thin so that said elastic legs are bent easily.

4. A fastener according to claim 1, further comprising:

connecting portions provided between said elastic legs and said head portion, said connecting portions being thin.

5. A fastener according to claim 4, wherein said connecting portions between said elastic legs and said head portion have outer tapered surfaces which are inclined along the axial direction of the fastener.

6. A fastener according to claim 4, wherein said head portion comprises:

a core member, a circular plate provided at a top end of the core member, an upper flange disposed such that a predetermined interval is provided between the upper flange and the circular plate, an outer peripheral portion of the upper flange slightly bending upward toward the circular plate, and a lower flange provided under the upper flange, an outer peripheral portion of the lower flange widening in an umbrella-like shape toward the leg portion.

7. A fastener according to claim 6, wherein the elastic legs include relatively thinned portions along proximal ends of said elastic legs proximate to said head portion and longitudinal side portions of said elastic legs which are adjacent to said leg plate, and said elastic legs are connected to said leg plate and are integral with said connecting portions.

8. A fastener according to claim 7, wherein an outer contour of said elastic legs is substantially the same as an inner contour of the mounting hole.

9. A fastener including a head portion having a diameter larger than a diameter of a mounting hole formed in a mounting panel, and a leg portion extending from said head portion for insertion into the mounting hole, and connecting portions provided between said head portion and said leg portion, said leg portion comprising:

a leg plate which extends from said head portion, said leg plate having a distal end which is tapered, and opposing transverse sides that extend along a longitudinal direction of the leg plate;

elastic legs integrally connected to the transverse sides of the leg plate, and circumferentially projecting from said transverse sides of said leg plate such that hollow portions are formed between said elastic legs and said leg plate, wherein distal ends of said elastic legs are integral with said leg plate to form a conical insertion portion, and proximal ends of said elastic legs are connected to said head portion via said connecting portions; and pawl portions protruding from outer peripheral surfaces of said elastic legs, said pawl portions having outer curved surfaces having curvatures that are larger than a curvature of the mounting hole of the mounting panel, wherein said elastic legs project circumferentially past an axial center of said leg plate and project past a cutting line which divides said leg plate in half in a transverse direction thereof, said pawl portions reaching a maximum protrusion such that the protrusions point-contact an inner peripheral surface of the mounting hole of the mounting panel upon insertion into the mounting hole, whereby frictional force with the mounting hole is reduced and insertion force is reduced.

10. A fastener according to claim 9, wherein said connecting portions provided between said elastic legs and said head portion are thin.

11. A fastener according to claim 9, wherein said connecting portions between said elastic legs and said head portion have outer tapered surfaces which are inclined along the axial direction of the fastener.

12. A fastener according to claim 9, wherein a width of a proximal end of said leg plate is substantially the same as an inner diameter of the mounting hole of the mounting panel.

13. A fastener according to claim 9, wherein an outer contour of said elastic legs is substantially the same as an inner contour of the mounting hole.

14. A fastener according to claim 9, wherein portions of said elastic legs that are connected to said elastic plate are thin so that said elastic legs are bent easily.

15. A fastener according to claim 9, wherein said head portion comprises:

a core member, a circular plate provided at a top end of the core member, an upper flange disposed such that a predetermined interval is provided between the upper flange and the circular plate, an outer peripheral portion of the upper flange slightly bending upward toward the circular plate, and a lower flange provided under the upper flange, an outer peripheral portion of the lower flange widening in an umbrella-like shape toward the leg portion.

16. A fastener according to claim 15, wherein the elastic legs include relatively thinned portions along proximal ends of said elastic legs proximate to said head portion and longitudinal side portions of said elastic legs which are adjacent to said leg plate, and said elastic legs are connected to said leg plate and are integral with said connecting portions.

* * * * *